United States Patent [19]
Chen et al.

[11] Patent Number: 6,067,118
[45] Date of Patent: May 23, 2000

[54] METHOD OF FRAME-BY-FRAME CALCULATION OF QUANTIZATION MATRICES

[75] Inventors: Yingwei Chen, Ossining, N.Y.; Kiran Challapali, Stamford, Conn.

[73] Assignee: Philips Electronics North America Corp., New York, N.Y.

[21] Appl. No.: 08/991,521

[22] Filed: Dec. 16, 1997

[51] Int. Cl.[7] .................................................... H04N 7/30
[52] U.S. Cl. ............................................................ 348/405
[58] Field of Search .................................. 348/405, 407; H04N 7/30

[56] References Cited

U.S. PATENT DOCUMENTS

| | | | |
|---|---|---|---|
| 5,051,840 | 9/1991 | Watanabe | 358/433 |
| 5,136,377 | 8/1992 | Johnston | 348/415 |
| 5,231,484 | 7/1993 | Gonzales | 348/405 |
| 5,282,031 | 1/1994 | Kim | 348/420 |
| 5,321,440 | 6/1994 | Yanagihara | 348/408 |
| 5,323,187 | 6/1994 | Park | 348/405 |
| 5,369,439 | 11/1994 | Matsuda | 348/405 |
| 5,410,351 | 4/1995 | Kojima | 348/405 |
| 5,426,463 | 6/1995 | Reininger | 348/405 |

*Primary Examiner*—Howard Britton
*Attorney, Agent, or Firm*—Gregory L. Thorne

[57] ABSTRACT

A method of reducing distortion in a video signal by coding a video frame utilizing a quantization matrix specifically determined for the video frame. The method includes the steps of determining the degree to which the video signal is spread about an average value, determining an average quantizer scale-value Q for the video frame, determining a reference weighted distortion for all DCT frequency bands in the video frame, determining the quantization parameter through a normalized distortion function, determining each weight for each DCT frequency band and coding the video frame taking into account the determined weights in the quantization matrix.

3 Claims, 6 Drawing Sheets

METHOD OF FRAME-BY-FRAME CALCULATION OF QUANTIZATION MATRICES

This invention was made with United States Government support under Cooperative Agreement No. 70NANB5H1174 awarded by the National Insititute For Standards and Technology (NIST). The United States Government has certain rights in the invention.

FIELD OF THE INVENTION

The present invention relates to digital video compression techniques in general, and in particular, to a method of minimizing the distortion in a video by selective calculation of quantization matrices.

DESCRIPTION OF THE RELATED ART

In an MPEG2 intra-only encoder, such as an encoder that generates MPEG2-conformant bitstreams, the compression process consist of DCT transform, scalar quantization and run-length coding. Among these three steps, quantization is the core of compression and the primary phase where distortion is introduced. In a well-designed quantization scheme, the amount of compression distortion tolerable is weighed against the available bit-rate transmission capabilities. That is, given a coefficient, the smaller the quantization step-size, the smaller the distortion introduced. However, achieving a smaller step size requires additional bits to code the coefficient.

The ultimate goal of any quantization scheme designed for image or video compression is to achieve the best visual quality under the given bit budget. The article entitled "Image Coding Applications of Vision Models, by D. J. Sakrison, and published in *Image Transmission Techniques*, W. K. Pratt, Ed., New York Academic Press, May, 1979, pp.21–51, highlights that it is known that the human visual system (HVS) responds differently to distortion in an image in different frequency-bands, and therefore, it is desirable that the encoder has control over the distribution of distortion in all the frequency-bands. The present invention takes advantage of the fact that MPEG2 provides for the transmission of quantization matrices on a frame-by-frame basis to enable processing each frequency-band differently.

A quantization matrix consists of sixty-four entries, each entry being designated a weight, which, together with a quantizer scale-value, determine quantization step-sizes for a block of DCT coefficients. The sixty-four (64) entries, each being an 8-bit integer ranging from 1 to 255, correspond to 8×8 DCT coefficients in a block. Because a DCT coefficient is divided by its corresponding weight, larger weights imply coarser quantization, and consequently require fewer bits to code that coefficient. By adjusting the entries in the quantization matrix relative to each other, the encoder can control both the distortion in DCT frequency-bands and the number of bits needed for that band.

Many factors, among them contrast masking and error pooling, can impact the amount of perceived distortion in different frequency-bands. Additionally, contrast sensitivity, which is the varying sensitivity of the HVS to even the same amount of distortion in different frequency-bands, impacts the amount of perceived distortion. This phenomenon was recognized in Sakrison's work and can be described by a Modulation Transfer Function (MTF). Also impacting the amount of perceived distortion is the fact that quantization distortion across different frequency-bands can differ even if the same quantization scheme is used for all bands, because DCT coefficients from a range of frequency-bands have different statistics. Therefore, in designing optimal quantization matrices, contrast sensitivity and quantization distortion must be considered to achieve a better visual quality.

Calculation of quantization matrices has been widely investigated. In the Grand Alliance HDTV system, the quantization matrix is adjusted such that the distribution of DCT coefficients in each frequency-band best matches the "optimal" distribution for the Variable-Length-Code table provided by the MPEG standard. A Laplacian model is used to describe the distribution of the DCT coefficients.

The aforementioned "Image Coding Applications of Vision Models" article also describes an "or" system to model the human perception of distortion in a picture. Specifically, the perceptually weighted distortion for each frequency band is compared to a threshold, and if any of the distortion exceeds that threshold, then the altered image can be distinguished from the original, or the altered image is said to be perceptually distorted from the original. Based on this model, in an article entitled "Signal Compression Based on Models of Human Perception" by Messrs. Jayant, Johnston and Safranek, and published in the *Proceedings of the IEEE*, Vol. 81, No. 10, October, 1993, a perceptual distortion measure, called JND (Just Noticeable Difference) or MND (Maximum Noticeable Difference) is proposed. This proposal describes the subjective quality of a picture and a method that utilizes the MND measure to optimize image quality. In other works on computing quantization matrices for individual pictures, such as "DCT Quantization Matrices Visually Optimized For Individual Images", *Human Vision, Visual Processing and Digital Display IV*, (B. E. Rogowitz, Ed. *Proceedings of the SPIE*, 1993, pp. 1913–14) by A. B. Watson, there is an incorporation of contrast sensitivity, contrast masking and error pooling. However, this known method is achieved through undesirably large amounts of computation which is avoided by the present invention.

Therefore, while there are several ways to tune the quantization scheme in an MPEG2 encoder, such as changing the quantizer scale-value on a macroblock-by-macroblock basis, arbitrarily determining the quantization boundaries (used to decide on what levels to quantize the coefficients) by the encoder, a method to control (or regulate) distortion across frequency bands by updating the quantization matrix on a frame by frame basis and an improved method to calculate a quantization matrix, is desired.

SUMMARY OF THE INVENTION

In accordance with the invention, a method of reducing distortion in a video signal by coding a video frame utilizing a quantization matrix specifically determined for the video frame is provided. The method preferably includes the steps of determining the degree to which the video signal is spread about an average value, determining the average quantizer scale-value Q for the video frame, determining a reference weighted distortion for all DCT frequency bands in the video frame to which the weighted distortion of every AC frequency band shall be equal, determining the quantization parameter through a normalized distortion function $f(\beta)$, determining each weight $W_{k,l}$ for each DCT frequency band, and coding the video frame taking into account the determined weights in the quantization matrix.

In an alternative embodiment, the method in accordance with the invention includes initially generating a look-up table for determining $\beta_{k,l}$ as a function of $f(\beta_{k,l})$, determining an average quantizer scale value Q for a video frame, determining a reference weighted distortion by fixing the weight for the first frequency band to a predetermined value, and thereafter repeating only the steps of determining the degree to which an input signal is spread about an average value ($\lambda$) of the DCT coefficients, determining the normalized weighted distortion $f(\beta_{k,l})$, looking up $\beta_{(k,l)}$ of as a function of $f(\beta_{k,l})$ from the table, computing the weights for the respective frequency bands, and coding the video frame using the calculated matrix.

Therefore, in accordance with the invention, a method of reducing distortion in a video signal by coding a video frame utilizing a quantization matrix specifically determined for the video frame is provided.

Accordingly, an object of the present invention is to provide an improved method of minimizing the distortion resulting from each frequency band in a video frame.

Still a further object of the present invention is to reduce the perceived visual distortion in a video picture.

Another object of the invention is to provide an improved method of computing quantization matrices so as to achieve an improved video picture via a reduction in perceived visual distortion.

Still other objects of the invention will in part be obvious and will in part be apparent from the specification.

The invention accordingly comprises the several steps and the relation of one or more of such steps with respect to each of the others, and the apparatus embodying features of construction, combination of elements, and arrangement of parts which are adapted to effect such steps, all as exemplified in the following detailed disclosure, and the scope of the invention will be indicated in the claims.

BRIEF DESCRIPTION OF THE DRAWING

For a fuller understanding of the invention, reference is made to the following description, taken in connection with the accompanying drawing, in which.

DETAILED DESCRIPTION OF THE PREFERRED EMBODIMENTS

Figure 1:
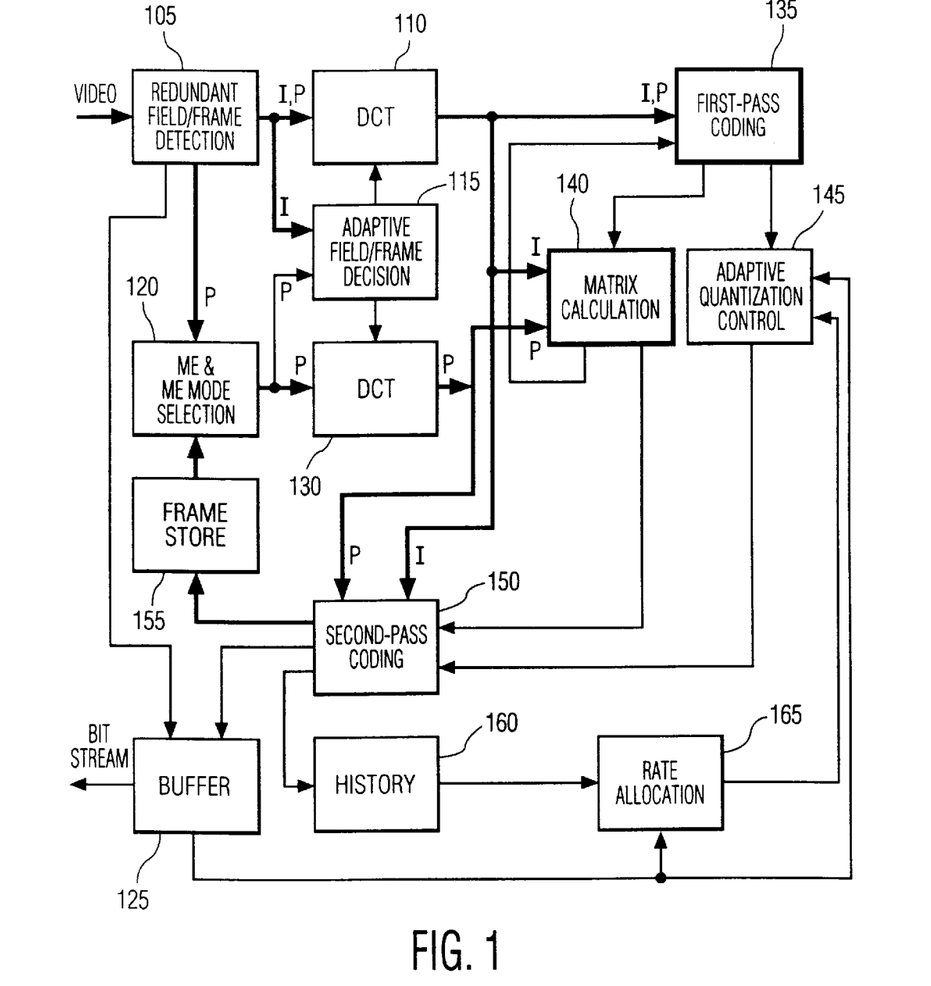
FIG. 1 is block diagram depicting the preferred construction of an apparatus that carries out the preferred method of reducing distortion in a video frame.

Reference is now made to FIG. 1, wherein a coding system, generally indicated at 100, constructed in accordance with the present invention, is depicted. System 100 is particularly suited for performing the method of the present invention which includes the calculation of the quantization matrix on a frame by frame basis. For the embodiment depicted in FIG. 1, a video signal is inputted to a redundant field/frame detector 105. Detector 105 is coupled to a discrete cosine transformer 110, an adaptive field/frame decision block 115, a ME/ME Mode Selector 120 and a buffer 125, the functions of which would be well understood by one of ordinary skill in the art. Likewise, as would be understood by one of skill in the art, selector 120 is coupled to decision block 115 and a second discrete cosine transformer 130. Still further, transformer 110 is coupled to a first pass coder 135, which itself is coupled to a matrix calculator 140 and an adaptive quantization controller 145. A second pass coder 150 is coupled to the outputs of calculator 140 and controller 145. As would also be understood in the art, coder 150 is coupled to a frame storer 155 (which itself is coupled to selector 120), buffer 125, a history block 160, transformers 110 and 130 and coder 135, the interrelationship therebetween all being understood by one of ordinary skill in the art. Lastly, a rate allocator 165 is provided and coupled to history block 160, buffer 125 and controller 145.

In operation, a video input signal is organized into frames. Motion estimation is performed if the current picture type is Non-Intra. The frame is then divided into blocks and DCT transformed depending on whether frame-DCT or field-DCT should be used for each macroblock. First-pass coding is carried out, and an average quantizer-scale Q for this frame is estimated as a function of the bit-allocation for this frame. Quantization matrices are calculated for Intra pictures and used in coding the Intra-pictures.

Generally speaking, In any DCT based coding method that permits updating quantization matrices, such as MPEG2, DCT transform is performed on blocks, each of which contains 8×8 pixels. The 8×8 DCT coefficients are then quantized according to the quantizer scale-value for that macroblock, the quantization matrix (or matrices, in the case of 4:2:2 or 4:4:4 chroma resolution), and the decision boundaries.

To measure the visually perceived deviation of the compressed image from the original, a weighted-distortion measure is used. The mean-squared (unweighted) distortion is first calculated for all frequency-bands, and then weighted by a perceptual-weighting table based on the MTF function for the particular viewing condition. Since the original MTF function was obtained for Fourier Transform coefficients, it must be modified in order to be used on DCT coefficients. These steps have been proposed in an article entitled "A Visual Model Weighted Cosine Transform for Image Compression and Quality Assessment", by N. B. Nill *IEEE Trans. Comm.*, Vol. Com-33, No. 6, June, 1985, using a modification function for the MTF.

Additionally, calculation of quantization matrices involves minimizing the summation of perceptually weighted distortion over all macroblocks for a picture while being constrained by a bit budget. The distortion weighting is based on contrast sensitivity.

There are two types of usage for quantization matrices due to different chrominance resolutions. Therefore, the data set needed to calculate each quantization matrix is not always the same. For example, in the case of 4:2:0 chrominance resolution, where luminance and chrominance signals share one quantization matrix, the set of data used to calculate the quantization matrix is the set of all three components, i.e., Y, U and V. In the case of 4:2:2 or 4:4:4 chrominance resolution, a separate quantization matrix is allowed for chroma, where the data needed to calculate one of the two matrices is either luma or chroma.

If $d_{k,l}$ represents the weighted-distortion for the (k,l)th frequency-band, the (k,l)th entry in the perceptual-weighting table being denoted $\alpha_{k,l}$ and the (k,l)th DCT coefficient in block Number b being denoted $C_{k,l}^b$, then the weighted distortion for the (k,l)th frequency band $d_{k,l}$ is $$d_{k,l} = \alpha_{k,l}^2 \sum_{b=0}^{B I} (C_{k,l}^b - C_{k,l}^{\sim b})^2. \quad \text{(EQ. 1)}$$

This quantity represents the summation of quantization distortion of the (k,l)th frequency band over the entire frame after being weighted by the corresponding perceptual-weighting factor $\alpha_{k,l}$, where $\alpha_{k,l}$ is a constant set in dependence on viewing conditions, B is the total number of blocks in the frame, and $C_{k,l}^{\sim b}$ is the quantized DCT coefficient for the (k,l)th frequency band.

Two approaches can be used to obtain $d_{k,l}$ as a function of the quantization matrix. One less than desirable approach is to actually quantize the coefficients using a large number of well-chosen matrices and calculate the distortion, which requires a large amount of computation. The other approach is to mathematically model the statistical properties of the DCT coefficients and find an analytical expression for the distortion in terms of the parameters of the quantizer. Although the effectiveness of the analytical approach depends on the accuracy of the model, an explicit expression is much easier to manipulate and evaluate. It is known from work published in a book entitled *Digital Pictures*, pp. 206–218, by Netravali and Haskell (Plenum Press, 1995) that the statistics of AC DCT coefficients can be modeled by Laplacian distribution. By modeling the data using Laplacian distribution, the statistics of the DCT coefficients of a particular frequency-band can be described by a single variable which can be estimated from the data in the current frame. Further, with the same model, there is a closed-form relationship between the quantization error and the quantization step-size, and this greatly saves computation. Therefore, the Laplacian model for DCT coefficients is preferred.

The probability-distribution function of a Laplacian random variable X with parameter $\lambda$ is:

$$P_x(x) = \frac{1}{2\lambda} e^{-|\lambda|}, \quad -\infty < x < \infty \quad \text{(Eq. 2)}$$

The variance of X, $\sigma_X^2$ is $2\lambda^2$, and $$\sigma = \sum_{b=0}^{B-1} (C_{k,l}^b)^2,$$

where B is the block index. Lambda ($\lambda$) represents how spread out the signal is around the average value of the DCT coefficients. Therefore, $\lambda$ for the (k,l)th frequency band is denoted $\lambda_{k,l}$ and the corresponding variance is $\sigma_{k,l}^2 = 2\lambda_{k,l}^2$.

The reconstruction levels, mandated by the MPEG Standard, represent (are a function of) the reconstructed quantized, DCT coefficient and, for the (k,l)th frequency-band are $r_{k,l}^i$, $i=0,\pm1\pm2,\pm3,\pm4$ where i indexes the reconstruction level closest to x. The weighted-distortion for the (k,l)th frequency-band is then $$d_{k,l} = \alpha_{k,l}^2 \sum_{i=-\infty}^{\infty} \int_a^{b_i} (x - r_{k,l}^j)^2 p_x(x) dx, \quad \text{(Eq. 3)}$$

where $a_i$ and $b_i$, which are commonly used in MPEG-2Test Model 5, are the lower and upper quantization boundaries respectively. Therefore, $r_{k,l}^i$ for an intra picture as mandated by the MPEG2 standard is:

$$r_{k,l}^j = \frac{2iW_{k,l}Q}{32} = \frac{iW_{k,l}Q}{16}. \quad \text{(EQ. 4)}$$

$W_{k,l}$ is the (k,l)th weight entry of the quantization matrix. Q is used as the quantizer scale-value for every macroblock as an approximation, as the quantizer scale-value for each macroblock varies according to the local complexity and the buffer fullness. Nevertheless, Q serves as a good approximation for the entire picture.

As stated above, with the MPEG-2 Test-Model 5 quantizer being used, the values $a_i$ and $b_i$ are $$a_i = r_{k,l}^j - 0.5 \, \Delta_{k,l} \quad \text{(Eq. 5)}$$

$$b_i = r_{k,l}^j + 0.5 \, \Delta_{k,l}. \quad \text{(EQ. 6)}$$

$\Delta_{k,l}$ is the quantization step-size for the (k,l)th band and $$\Delta_{k,l} = \frac{W_{k,l}Q}{16} \quad \text{(Eq. 7)}$$

Replacing $a_i$ from Eq. 5, $b_i$ from Eq. 6 and $p_x(x)$ from Eq. 2, the weighted distortion (see Eq. 3) for the (k,l)th frequency can be stated as:

$$d_{k,l} = 2\alpha_{k,l}^2 \lambda_{k,l}^2 \left(1 - \frac{\beta_{k,l}}{e^{\frac{\beta_{k,l}}{2}} - e^{-\frac{\beta_{k,l}}{2}}}\right), \quad \text{(Eq. 8)}$$

where $\beta_{k,l}$ is defined as $$\beta_{k,l} = \frac{\Delta_{k,l}}{\lambda_{k,l}}. \quad \text{(Eq. 9)}$$

The maximal noticeable difference (MND) of the picture therefore is $$\text{MND} = \max_{k,l}(d_{k,l}) \quad \text{(Eq. 10)}$$

It can be established that the minimization of MND requires all $d_{k,l}$'s to be equal. This can be established by considering the alternative, that is, if one or more $d_{k,l}$'s is (are) larger than the others. The maximum of these "larger" $d_{k,l}$'s can always be reduced by raising the smaller distortions and reducing these "larger" ones. Accordingly, it can be seen that the minimization of the maximum distortion can be achieved by equating all the $d_{k,l}$'s.

Accordingly, it is subsequently necessary to find the minimum possible weighted distortion to which all $d_{k,l}$'s should be equal. However, because it is the relative magnitudes of the matrix entries that determine how to quantize the several DCT frequency bands, it is possible to select a reference frequency band with a fixed quantization weight, for example, 16, and use the reference frequency band to calculate the reference weighted distortion. However, it should be understood that other values could be selected.

It is preferable to use one of the lowest frequency bands other than DC as the reference frequency band. If this selected frequency band is designated 0,1 and $\alpha_{0,l}$ is set equal to one (1) and the corresponding quantization matrix entry is set to 16, then the reference weighted distortion can be characterized as:

$$d_0 = 2\lambda_{0,1}^2 \left( 1 - \frac{\frac{Q}{\lambda_{0,1}}}{e^{\frac{Q}{2\lambda_{0,1}}} - e^{-\frac{Q}{2\lambda_{0,1}}}} \right).$$ (Eq 11)

As stated above, Q can be estimated from the coding history or from the first pass coding, both of which should be understood by one of ordinary skill in the art. Since the value of Q reflects the bit allocation to the current frame as well as the complexity of the picture, it determines the minimum possible perceptual distortion given the number of bits and the current picture being coded.

Now that $d_0$ has been solved, the weighted distortion for all other frequency bands can be found from the relationship $$d_{k,l} = d_0, \ (k,l) \neq (0,0).$$ (Eq. 12)

That is, $$2\alpha_{k,l}^2 \lambda_{k,l}^2 \left( 1 - \frac{\beta_{k,l}}{e^{\frac{\beta_{k,l}}{2}} - e^{-\frac{\beta_{k,l}}{2}}} \right) = d_0$$ (Eq. 13)

and, since $\alpha_{k,l}$ is a constant and $\lambda_{k,l}$ can, as stated above, be estimated from the unquantized DCT coefficients, a normalized distortion function $f(\beta_{k,l})$ can be derived as:

$$f(\beta_{k,l}) = \frac{d_{k,l}}{2\alpha_{k,l}^2 \lambda_{k,l}^2} = 1 - \frac{\beta_{k,l}}{e^{\frac{\beta_{k,l}}{2}} - e^{-\frac{\beta_{k,l}}{2}}}$$ (Eq. 14)

Figure 3:
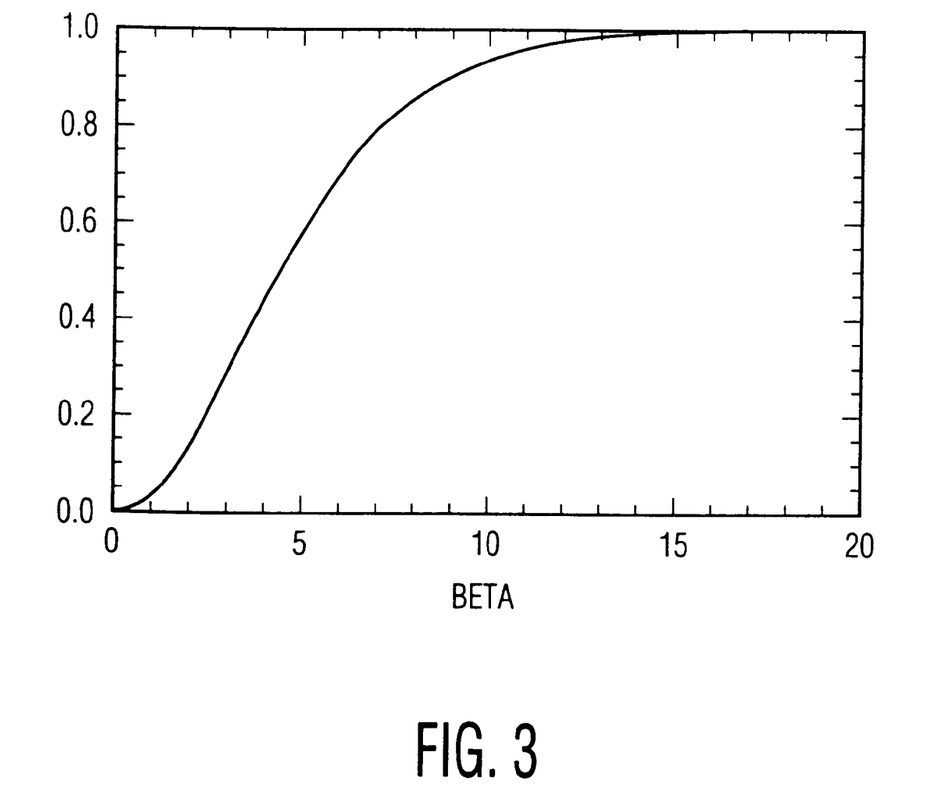
FIG. 3 is a graph illustrating a normalized distortion function derived in accordance with the present invention.

Referring now to FIG. 3, it can be seen that $f(\beta_{k,l})$ monotonically increases from 0 to 1, which is consistent with the appreciation that the quantization distortion increases with the step sizes and is never greater than the variance of the input data. Therefore, the expression for $f(\beta_{k,l})$ becomes:

$$f(\beta_{k,l}) = \frac{d_0}{2\alpha_{k,l}^2 \lambda_{k,l}^2} = 1 - \frac{\beta_{k,l}}{e^{\frac{\beta_{k,l}}{2}} - e^{-\frac{\beta_{k,l}}{2}}},$$ (Eq. 15)

As can be observed from FIG. 3 and Equation 15, it is possible for $f(\beta_{k,l})$ to be greater than 1, in which case Eq. 15 does not have a solution. This can be seen when Q is large, especially for high frequency-bands. However, if such a situation occurs, it can be appreciated that even though $W_{k,l}$ is infinity, i.e., every coefficient in that frequency-band is quantized to 0, the weighted-distortion for that band is still lower than the reference weighted-distortion. Hence the entire frequency-band can be quantized to 0. In other words, the value of $f(\beta_{k,l})$ can be used as a criterion to drop coefficients.

Figure 2A:
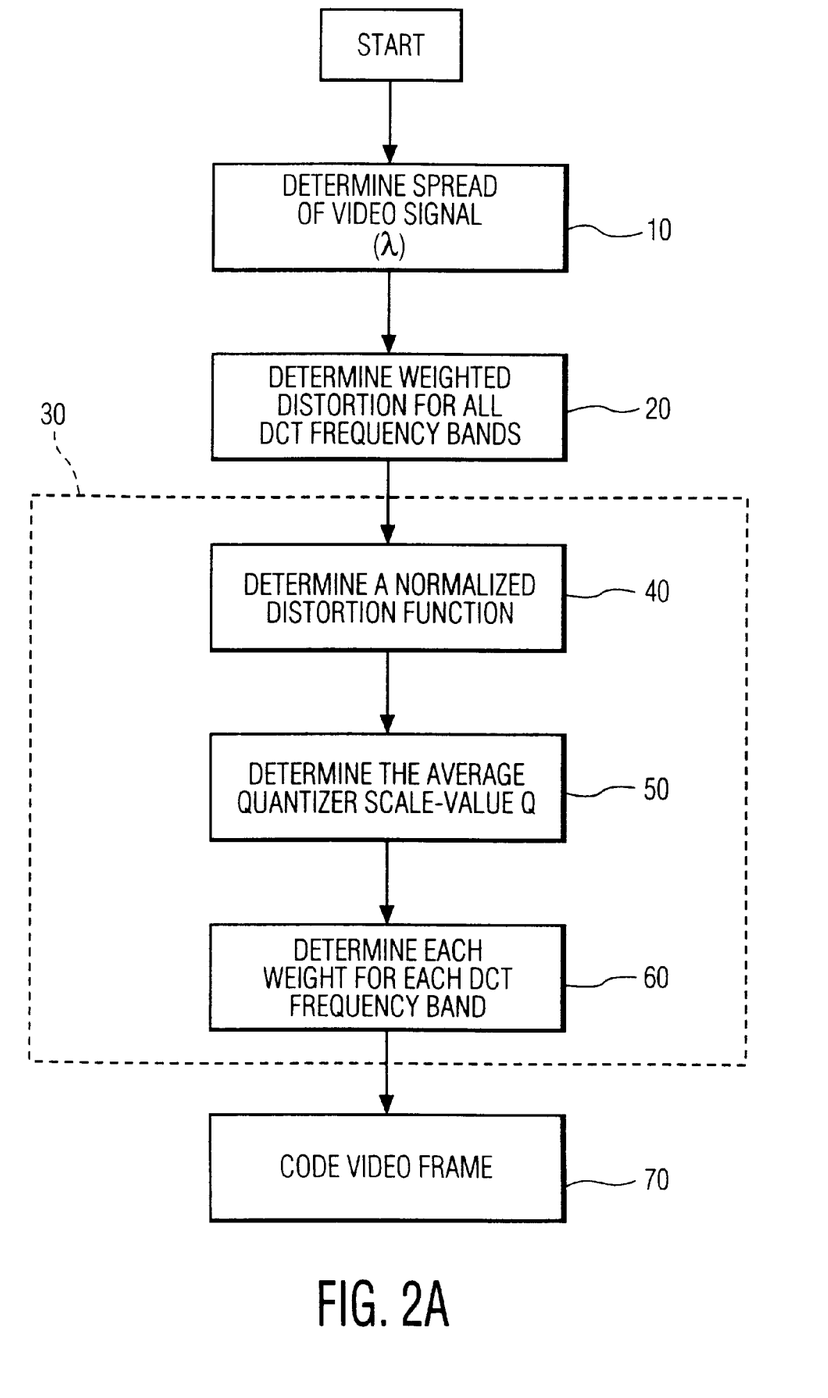
FIGS. 2A and 2B are flowcharts illustrating preferred method steps in accordance with the present invention.

For clarity, reference is now made to FIG. 2A which depicts the method steps in accordance with the present invention. Specifically, the method of reducing distortion in a video signal by coding a video frame utilizing a quantization matrix specifically determined for the video frame, includes a first step of determining the degree to which the video signal is spread about an average value of the DCT coefficients (step 10), then determining the weighted distortion for all DCT frequency bands in the video frame (step 20), and thereafter determining the individual weights in a quantization matrix in each of the DCT frequency bands such that the weighted distortion across all the frequency bands is minimized (step 30). This third step can be achieved by further carrying out the steps of determining a normalized distortion function $f(B_{k,l})$, where $$f(\beta_{k,l}) = \frac{d_0}{2\alpha_{k,l}^2 \lambda_{k,l}^2} = 1 - \frac{\beta_{k,l}}{e^{\frac{\beta_{k,l}}{2}} - e^{-\frac{\beta_{k,l}}{2}}}$$

(step 40), determining the average quantizer scale-value Q for the video frame (step 50), and determining each weight $W_{k,l}$ for each DCT frequency band from the relationship:

$$W_{k,l} = 16 \frac{\lambda_{k,l} \beta_{k,l}}{Q}$$

(step 60). Lastly, the video frame is coded taking into account the determined weights in the quantization matrix (step 70). That is, with the quantization matrix being calculated, one skilled in the art would know how to code the video frame, and for brevity, such explanation will be omitted herein.

The step of determining the average quantizer scale-value Q (step 50) may include the substeps of estimating Q from the first coding pass in a two-pass coding system or estimating Q from the coding history.

Figure 2B:
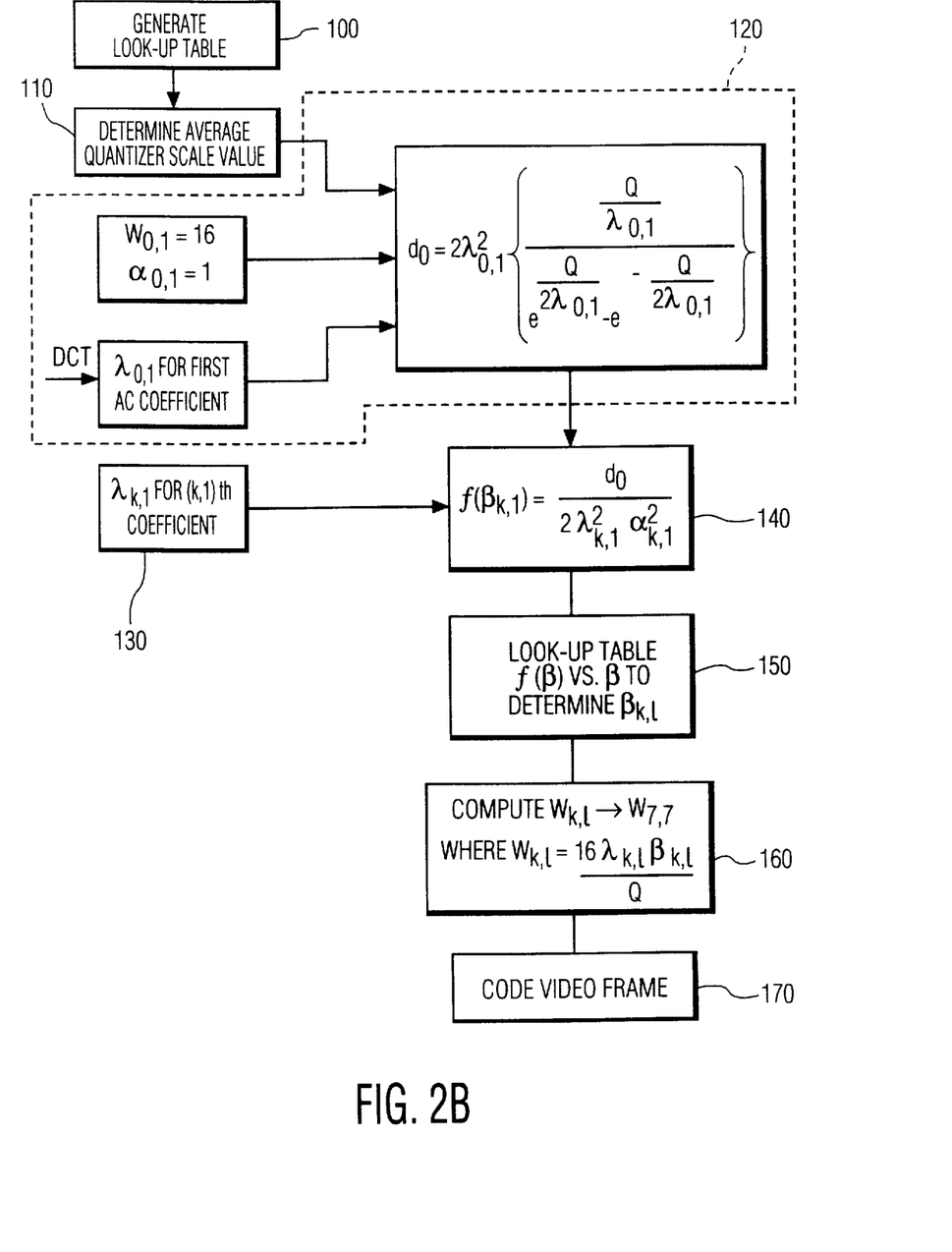

In an alternate embodiment, the method of reducing distortion for each frequency band on an outputted video signal can be carried out by the steps indicated in FIG. 2B. Initially, a look-up table, a portion of which is depicted below

| f | 0.040483 | 0.041273 | 0.042070 | 0.042874 | 0.043684 | 0.044502 | 0.045327 | 0.046158 | 0.046996 | 0.047841 |
|---|---|---|---|---|---|---|---|---|---|---|
| β | 1.00 | 1.01 | 1.02 | 1.03 | 1.04 | 1.05 | 1.06 | 1.07 | 1.08 | 1.09 | may be generated for determining $\beta_{k,l}$ as a function of $f(\beta_{k,l})$, where $$f(\beta_{k,l}) = 1 - \frac{\beta_{k,l}}{e^{\frac{\beta_{k,l}}{2}} - e^{-\frac{\beta_{k,l}}{2}}}$$

(step 100), an average quantizer scale value Q is determined for a video frame (step 110) and a reference weighted distortion is determined (step 120) by preferably fixing the weight for the first frequency band to 16. The method need not again repeat steps 100, 110 and 120, but need only, if applicable, repeat steps 130–170, wherein step 130 includes determining the degree to which an input signal is spread about an average value (λ) of the DCT coefficients, step 140 includes determining the normalized weighted distortion $f(\beta_{k,l})$, wherein:

$$f(\beta_{k,l}) = \frac{d_0}{2\alpha_{k,l}^2 \lambda_{k,l}^2};$$

step 150 includes looking up $\beta_{k,l}$ of as a function of $f(\beta_{k,l})$ step 160 includes computing the weights for the respective frequency bands from the relationship:

$$W_{k,l} = 16 \frac{\lambda_{k,l} \beta_{k,l}}{Q};$$

and step 170 includes coding the video frame using the calculated matrix.

Utilizing the method as claimed herein achieves a significant reduction in the visual distortion. For example, FIGS. 4 and 5 illustrate the significant improvements in distortion minimization utilizing the claimed method. All the intra coding has been performed on standard definition (SD) as well as high definition (HD) video sequences. The coded sequences depicted in the solid lines utilized the MPEG2 default intra matrix, while the dashed lines illustrate the reduced distortion achieved by the claimed method. For the SD sequences, the bit-rate is 30 Mbits/second, while for the HD sequences, the bit rate was 129 Mbits/second. The chroma resolution was 4:2:2 for all coding simulations. Two quantization matrices are computed for the three luminance and chrominance components. The reference weighted-distortion for chrominance is selected to be the same as that of the luminance component.

In particular, FIGS. 4 and 5 illustrate the distribution of the perceptually-weighted distortion by frequency-band of luma and chroma for "table tennis" and "winter trees". As stated above, the dashed lines represent the results obtained by using the calculated quantization matrices as disclosed herein, while the solid lines stand for the result s obtained by using the default intra matrix.

Figure 4A:
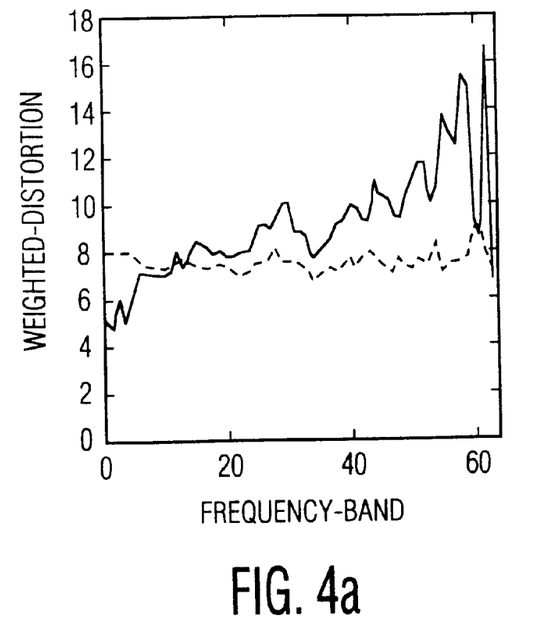
FIGS. 4 and 5 illustrate the improved and reduced distortion results achieved with the present invention, and in particular, are graphs of the weighted-distortion vs. frequency-band for the 9th frame of "table-tennis", and the 5th frame of "winter trees", respectively.
Figure 4B:
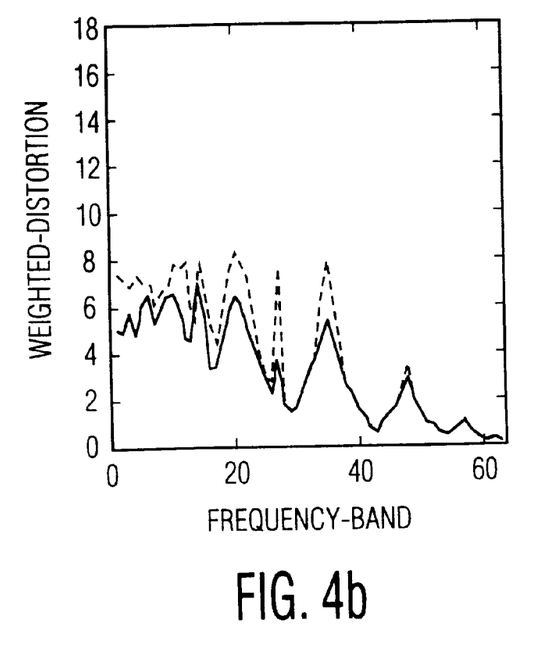
Figure 5A:
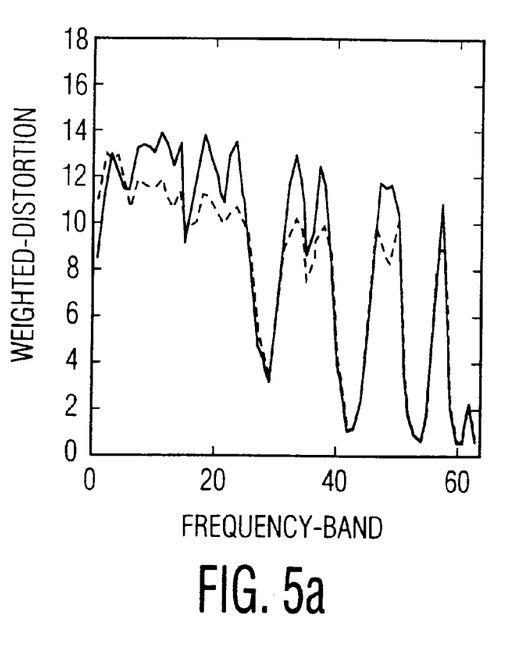
Figure 5B:
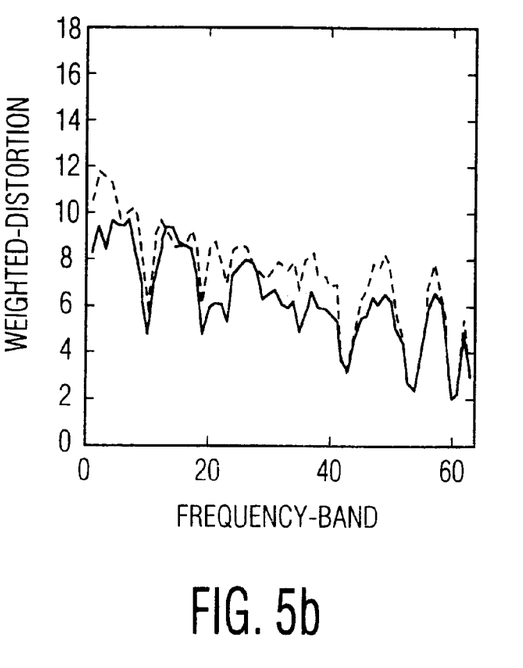

More specifically, FIGS. 4A and 5A illustrate the weighted-distortion of luma while FIGS. 4B and 4B illustrate the maximum of the weighted-distortion of the two chrominance components. In both cases, the variation of the weighted-distortion is much smaller and the maximum of the weighted distortion is much smaller if the calculated quantization matrices are used as disclosed herein.

The contrast illustrated in FIG. 4 is quite visible for luminance, while in FIG. 5, the distinction is somewhat less due to the MPEG2 default matrix being similar to those calculated in accordance with the invention. Although the weighted-distortion for chrominance is higher if the calculated quantization matrices are used than if the MPEG2 default matrix is used, this is so because when computing the quantization matrices, t he target weighted-distortion for chrominance is set to be equal to that of the luminance, which is higher than the weighted-distortion for chrominance if the default matrix is used to quantize both luma and chroma. By updating the quantization matrices dynamically using the claimed method, the encoder can control the quantization of luma and chroma depending on the requirement of applications.

We claim:

1. A method of reducing distortion in a video signal by coding a video frame utilizing a quantization matrix specifically determined for the video frame, the quantization step sizes for a block of DCT coefficients being dependent on the quantization matrix, the method comprising the steps of:
   (a) determining the degree to which the video signal is spread about an average value of the DCT coefficients;
   (b) determining the target weighted distortion for all DCT frequency bands in the video frame through the determination of a reference weighted distortion;
   (c) determining the individual weights in a quantization matrix in each of the DCT frequency bands such that the weighted distortion across all the frequency bands is minimized by carrying out the further steps of determining a normalized distortion function $f(B_{k,l})$, where $$f(\beta_{k,l}) = \frac{d_0}{2\alpha_{k,l}^2 \lambda_{k,l}^2} = 1 - \frac{\beta_{k,l}}{e^{\frac{\beta_{k,l}}{2}} - e^{-\frac{\beta_{k,l}}{2}}};$$

determining the average quantizer scale-value Q for the video frame; and determining each weight $W_{k,l}$ for each DCT frequency band from the relationship:

$$W_{k,l} = 16 \frac{\lambda_{k,l} \beta_{k,l}}{Q};$$

and
   (d) coding the video frame taking into account the determined weights in the quantization matrix, wherein $\alpha$ is the perceptual-weighting factor, $\beta$ is the quantization step normalized by the spread of the corresponding DCT coefficient, and $\lambda$ is the average value of the DCT coefficients.

2. The method as claimed in claim 1, wherein the step of determining the average quantizer scale-value Q includes the substeps of estimating Q from the first coding pass in a two-pass coding system or estimating Q from the coding history.

3. A method of reducing distortion for each frequency band on an outputted video signal by generating a look-up table for determining $\beta_{k,l}$ as a function of $f(\beta_{k,l})$ where $$f(\beta_{k,l}) = 1 - \frac{\beta_{k,l}}{e^{\frac{\beta_{k,l}}{2}} - e^{-\frac{\beta_{k,l}}{2}}},$$

determining an average quantizer scale value Q for a video frame, determining a reference weighted distortion by fixing the weight for a first frequency band to 16 and where the reference weighted distortion is $$d_0 = 2\alpha_{0,1} \lambda_{0,1}^2 \left( 1 - \frac{\frac{Q}{\lambda_{0,1}}}{e^{\frac{Q}{2\lambda_{0,1}}} - e^{-\frac{Q}{2\lambda_{0,1}}}} \right),$$

the method comprising the steps of:
   (a) determining the degree to which an input signal is spread about an average value ($\lambda$) of the DCT coefficients;
   (b) determining the normalized weighted distortion $f(\beta_{k,l})$, wherein:

$$f(\beta_{k,l}) = \frac{d_0}{2\alpha_{k,l}^2 \lambda_{k,l}^2};$$

(c) looking up $\beta_{(k,l)}$ of as a function of $f(\beta_{k,l})$;
   (d) computing the weights for the respective frequency bands from the relationship:

$$W_{k,l} = 16 \frac{\lambda_{k,l} \beta_{k,l}}{Q};$$

and (e) coding the video frame using the calculated matrix, wherein $\alpha$ is the perceptual-weighting factor and $\beta$ is the quantization step normalized by the spread of the corresponding DCT coefficient.

* * * * *